Feb. 25, 1936.   F. E. JONES   2,032,175
COOKING APPARATUS
Filed April 12, 1933   2 Sheets-Sheet 1

INVENTOR:
FRANK E. JONES
BY Saywell & Wesseler,
ATTORNEYS

Feb. 25, 1936.  F. E. JONES  2,032,175
COOKING APPARATUS
Filed April 12, 1933  2 Sheets-Sheet 2

INVENTOR:
FRANK E. JONES
BY Saywell & Wesseler
ATTORNEYS

Patented Feb. 25, 1936

2,032,175

UNITED STATES PATENT OFFICE 2,032,175

COOKING APPARATUS

Frank E. Jones, West Lafayette, Ohio, assignor to The Jones Metal Products Company, West Lafayette, Ohio, a corporation of Ohio Application April 12, 1933, Serial No. 665,701

18 Claims. (Cl. 219—43)

This invention, as indicated, relates to a cooking apparatus. More particularly, it comprises an apparatus providing a container for hot oil or grease within which an open container or grill is adapted to be immersed or to be elevated to an upper draining position. The apparatus is intended especially for the cooking of certain foods by a process known as French frying method or deep fat frying.

Heretofore apparatus for cooking potatoes and the like in a bath of oil or grease has been known, but such apparatus has not been particularly adapted for the rapid preparation of a product of this character and has been subject to the disadvantage of having carbonized fragments of the food in course of preparation circulate through the oil or grease bath discoloring and affecting the flavor of the food being prepared.

The present invention has for its principal object the provision of an apparatus which provides within the lower portion thereof an oil bath or the like which may be readily heated, preferably through a submerged electrical heating element positioned at a point where it will not circulate sludge or carbonized particles, and which will afford a means of quickly preparing a quantity of food of the character described within a very short period of time.

Another object of the invention is to provide a self-contained apparatus having a suitably insulated portion to carry a bath of oil or the like adapted to be brought to the required temperature through a submerged electrical heating element, and providing for a grill to be supported within such receptacle in two positions, one for the purpose of cooking, and the other for draining the excess oil or grease from the cooked product.

Another object of the invention is to provide a cooking apparatus having a wider upper section and a narrower lower section, the narrower lower section providing for the cooking of the food submerged therein within a grill or open basket, and the upper portion providing for a supporting of the grill or basket therein and the draining of the excess oil or grease therefrom after the cooking operation.

A still further object of the invention is to provide an improved grill or basket for the food, having hook and handle elements suitably shaped to permit the positioning of the basket within the cooking apparatus in a plurality of supported positions.

Another object of the invention is to provide an electrical cooking apparatus having an improved type of insulation and current carrying elements within the lower portion of the casing thereof, together with a thermostatic control, and a heating element for immersion within the lower portion of the oil bath.

Another object of the invention is to provide a cooking apparatus which is of high capacity for output, while embodying simple elements of construction easily maintained in constant service and so related to each other than a superior product may be produced free of discoloration and impurities.

Another object of the invention is to prolong the usable life of cooking fats or oils by thermostatic control of the heat, such thermostatic control eliminating excessively high temperatures which in turn cause rapid breaking down of fats or oils, and also avoiding the condition that when fats or oils become excessively over-heated, they are easily ignited, becoming thereby a fire hazard, which hazard is practically eliminated by a thermostatic control which maintains the temperature at a point below that at which fats or oils will burst into flame.

Other and further objects of the invention will appear in the course of the following description.

To the accomplishment of the foregoing and related ends, said invention, then, consists of the means hereinafter fully described and particularly pointed out in the claims, the annexed drawings and the following description setting forth in detail certain structures embodying the invention, such disclosed means constituting, however, but several of various forms in which the principle of the invention may be used.

Figure 1:
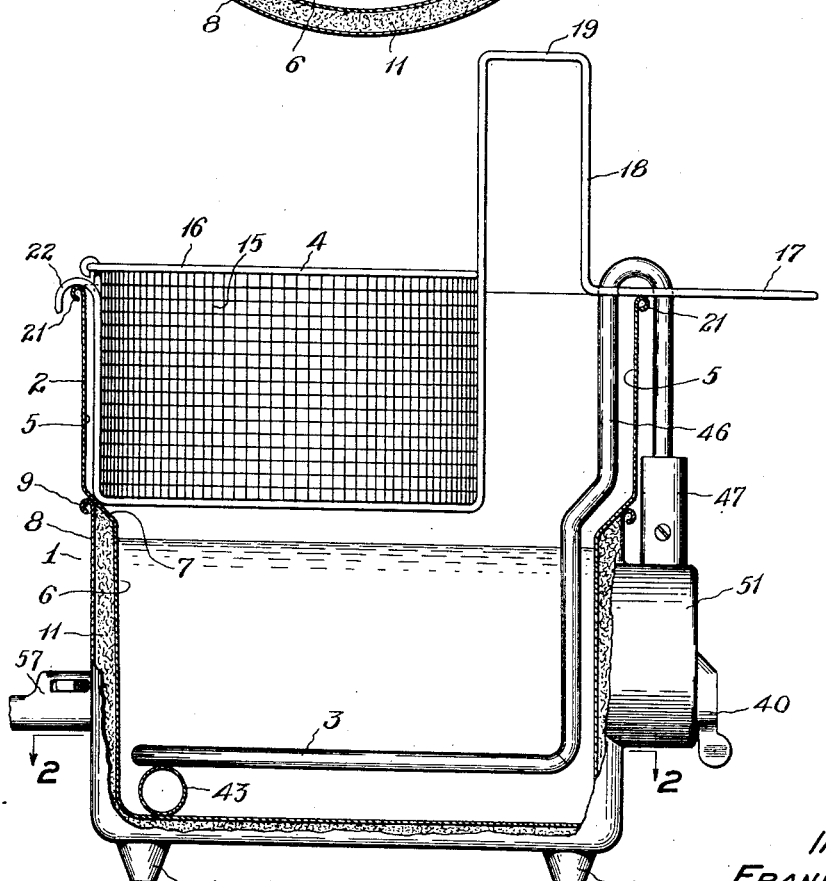
Figure 1 is a side elevation, partly in section, showing one form of apparatus embodying the principles of my invention, the basket being shown in elevated position.
Figure 5:
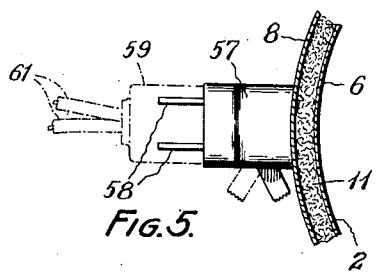
Figure 5 is a fragmentary view, partly in section, taken along the line 5—5, shown in Figure 3, looking in the direction of the arrows.
Figure 3:
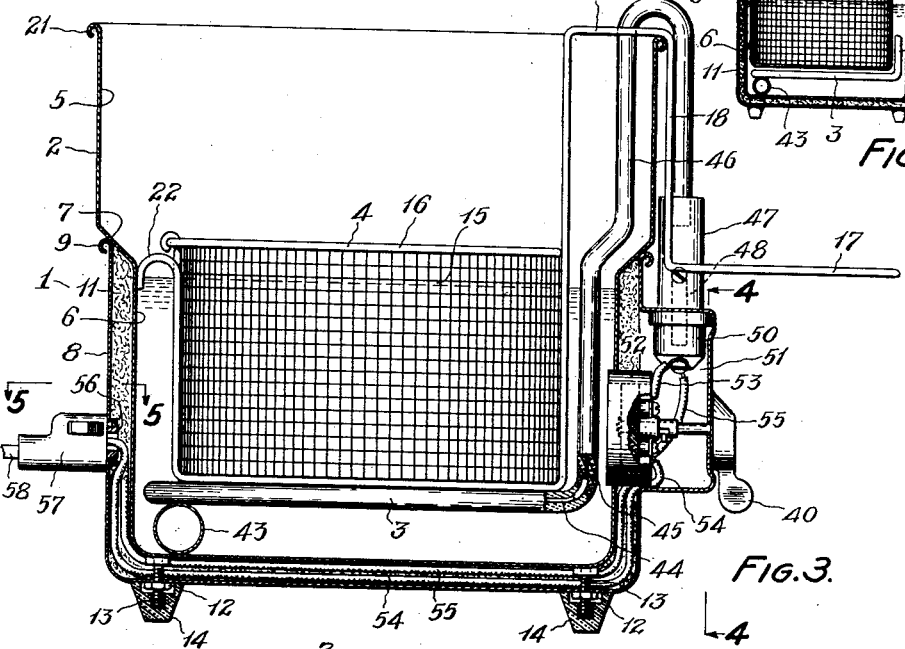
Figure 3 is a view similar to Figure 1, the basket being shown in cooking position, and the details of the switch and thermostat being illustrated.
Figure 4:
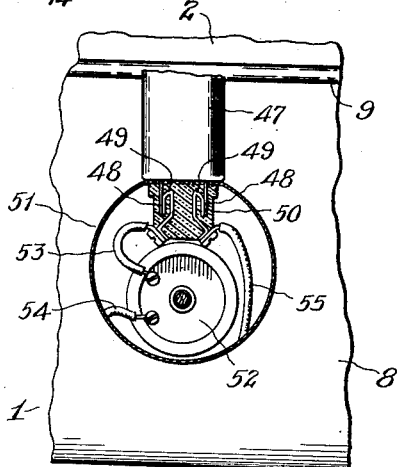
Figure 4 is a fragmentary sectional view, taken along the line 4—4, shown in Figure 3, looking in the direction of the arrows.

As is more particularly shown in Figures 1 and 3 of the drawings, the apparatus 1 comprises a receptacle or container 2 having a heating element 3 held in spaced relation to the bottom thereof, and having a basket or food container 4. The basket, as shown in Figure 3, may be supported in the lower cooking position, or as shown in Figure 1, may be supported in the upper draining position.

The receptacle 2 is preferably formed with an upper portion 5 of larger diameter and a lower portion 6 of smaller diameter joined at an approximately midway position by an inclined wall area 7. The lower portion of the vessel is preferably made as a double walled structure having an outer casing 8 in spaced relation to the lower circumferential wall and bottom portions, and terminating in a beaded upper edge 9 bearing against the outer inclined portion of the receptacle proper. A packing 11 of insulating material, such as "rock wool" or the like, may be inserted between the walls of the lower portion of the apparatus. The casing or shell 8 about the lower portion of the receptacle is held in position by means of lock nuts 12 engaged upon screw-threaded studs 13 secured to the bottom of the receptacle proper, such studs extending beyond the lock nuts and being engaged by cap nuts 14 in the form of inverted truncated cones which serve as feet for the apparatus. Thus the separable sections of the receptacle are firmly held to each other, and the lower portion thereof is thoroughly insulated against the loss of heat from the lower sides of the receptacle which contains the oil or grease bath, and also prevents the outer portion of the casing becoming too highly heated.

The basket member of the device may be variously formed to provide an openwork receptacle for the food, such as slices of potatoes to be French fried or similarly treated. The basket is preferably formed of a number of fine crossed wires 15 of relatively narrow mesh, supported at the top by a ring 16 of heavier wire and otherwise suitably reinforced as desired. The basket preferably is provided with a handle 17 which has an upward extension 18 of a height sufficient to properly position the basket in cooking position when the upper portion 19 of the extension rests upon the upper rim 21 of the receptacle, in the manner shown in Figure 3.

The handle is preferably formed of a doubled wire member which extends downwardly along one side of the basket and centrally across the bottom of the basket and then upwardly on the opposite side of the basket to a position slightly short of the top edge thereof, at which point it is bent outwardly to form a hook 22 adapted to engage the upper rim of the receptacle when the basket is placed in draining position, as is shown in Figure 1, the opposite handle portion 17 bearing against the opposite edge of the upper rim to assist in supporting the receptacle.

When the basket is in lowered cooking position, the upper portion of the extension 19, as stated, rests upon the upper rim of the receptacle, and the lower portion of the basket rests directly upon the upper portion of the heating element 3. The hook 22 serves to space the basket from the side of the receptacle opposite the position of the handle so as to permit free circulation of heated oil or grease about the contents of the receptacle.

Figure 7:
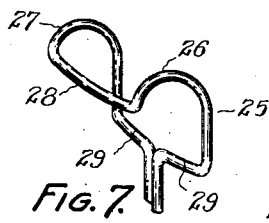
Figure 7 is an enlarged perspective view, showing the supporting hook member used in the basket construction shown in Figure 6.
Figure 6:
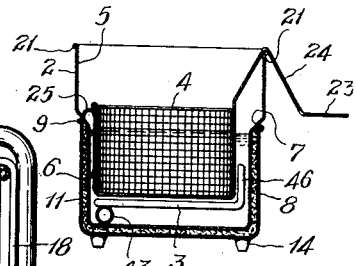
Figure 6 is a sectional view, illustrating a basket construction adapted to be supported upon the upper container walls when in cooking position.

In place of having the basket supported directly upon the heating element, means may be provided for supporting the basket in slightly spaced relation to the heating element. One form of so supporting the basket above the heating element is shown in Figure 6, wherein the handle 23 is provided with an upper extension 24 in the form of an inverted V-shape so that it will snugly engage over the adjacent upper rim 21 of the receptacle, supporting the basket on one side with the hook member 25 so shaped and proportioned as to engage against the intermediate inclined inner wall portion 7. The hook 25 may be formed in the manner illustrated in Figure 7, wherein the double bar forming the hook is spread apart so as to provide in effect two rim engaging members 26, 27, joined by an arcuate shaped member 28 to provide substantially alined contact with the outer curved rim portion of the receptacle. The lower portions of the spread apart section 29 at the base of the hook member may likewise be of arcuate shape to conform to the curvature of the inner wall of the receptacle.

Figure 8:
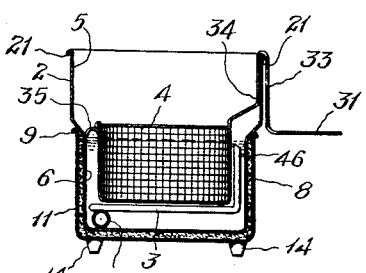
Figure 8 is a modified form of basket construction adapted to be supported in cooking position by means of the handle loop section.

Still another form of supporting the basket in spaced relation to the heating element is shown in Figure 8, wherein the handle 31 is formed with a narrow upward extension 33 which snugly engages over the upper rim of the receptacle 21 with its inner portion 34 bearing in direct contact with the inner upper side wall of the receptacle, and firmly supporting the basket through such interlocking engagement with the upper wall of the receptacle. The hook member 35 at the opposite side of the basket may assist in supporting the same by bearing against the opposite inner wall of the receptacle near the top of the narrow lower section of the receptacle.

Figure 2:
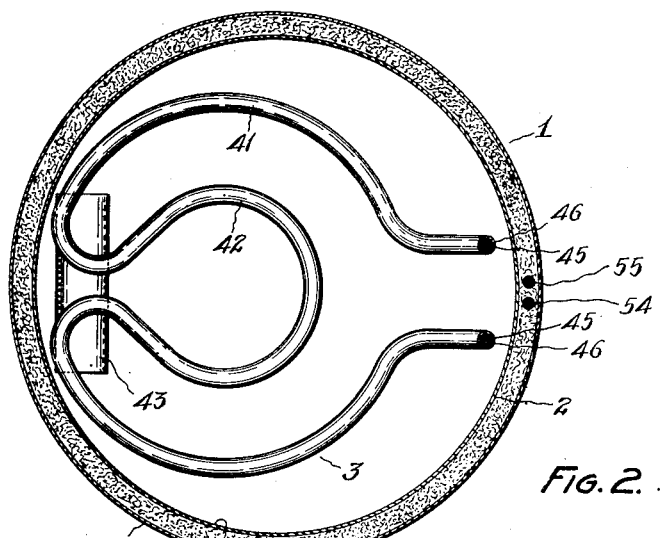
Figure 2 is a plan view partly in section, taken along the line 2—2, shown in Figure 1, looking in the direction of the arrows.

Various means of heating the receptacle may be employed, but the means preferably utilized is that shown more particularly in Figures 1, 2, and 3, wherein the heating element 3 is formed as a member bent upon itself in a single plane to provide an outer substantially circular area 41, and a concentric inner circular area 42 spaced therefrom and continuous therewith. In this manner, a large area of contact of the heating element with the liquid contents of the lower receptacle is provided for, and rapid heating action may be carried on. The heating element may be variously formed of suitable resistance metal covered with a refractory material to increase the heating effect thereof. The heating element is adapted to be held in spaced relation to the bottom of the receptacle either through its direct support or, as shown in Figures 1, 2, and 3, by means of a separate supporting element 43, preferably in the form of a hollow tubular member of refractory material interposed between the bottom of the heating element and the bottom of the receptacle.

The spacing of the heating element from the bottom of the receptacle should be sufficient in amount to permit the accumulation of all carbonized particles of food which may be caused in the ordinary operation of the apparatus to be received in such space as sludge. When such particles drop to the bottom of the receptacle, the same remain quiescent at such point due to the fact that the heating element is above the same and the circulation of the heated oil or other contents of the receptacle is very largely restricted to the area above such heating element rather than below the same, and thus the food or other contents of the basket are kept free of contact with carbonized particles which would tend to discolor the same. The accumulated sludge may be removed from time to time by removing the basket and heating element from the container and thoroughly cleansing the interior of the container.

The heating element, as stated, may be formed of a suitable resistance element such as nichrome wire 44 preferably encased in a refractory material, and is supplied with current through a conducting element such as copper wire 45 preferably encased in an insulating member such as a bakelite tube 46 shaped as shown in Figures 1 and 3 to conform to the inner vertical contour of the container and extend above the upper edge thereof in spaced relation and thence downwardly on the outer side thereof to a heater plug terminal 47 formed of bakelite or the like and carrying contact blades 48 to engage suitable contacts 49 in the terminal member 50 of the thermostat control 51. A suitable resistance member 52 controlled by the handle 40 is provided in the circuit being connected through the short conductor 53 and the main conductor 54 in the circuit having the other conductor 55 directly connected with the terminal 50. The conductors in the form of insulated wires 54 and 55 are carried through the space between the double walls of the lower portion of the apparatus, and through insulating bushing 56 substantially opposite the thermostatic control 51 where such conductors enter a switch 57 supported on the side of the casing 8. The switch provides a pair of contact elements 58, with which a pair of plug contacts carried upon a plug 59 may be engaged in the usual manner, said plug being secured to a flexible conductor 61 extending to a source of current supply.

Many variations may be made in the details of the structure hereinabove described, the principal feature of the device being the provision of an immersion heater above an area designed for the accumulation of sludge and with the various parts of the apparatus readily removable to permit the thorough cleansing of the same when required.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. An apparatus of the character described, having in combination a vessel providing a cooking area adjacent its lower portion and a draining area adjacent its upper portion, insulating means disposed about the sides and bottom of said lower area of said vessel, and a basket having combined supporting and spacing means on the handle and projecting outwardly from the upper margin of the basket opposite the handle adapted to position the same selectively within said cooking area or within said draining area.

2. An apparatus of the character described, having in combination a vessel providing a cooking area of approximately half the vertical extent thereof and of narrow width adjacent its lower portion and a draining area of approximately half the vertical extent thereof and of greater width than the lower area adjacent its upper portion, insulating means disposed about the sides and bottom of said lower area of said vessel, and a basket having combined supporting and spacing means on the handle and projecting outwardly from the upper margin of the basket opposite the handle adapted to position the same selectively within said cooking area or within said draining area.

3. An apparatus of the character described, having in combination a vessel providing a cooking area of approximately half the vertical extent thereof and of narrow width adjacent its lower portion and a draining area of approximately half the vertical extent thereof and of greater width than the lower area adjacent its upper portion, insulating means disposed about the sides and bottom of said lower area of said vessel, and a basket having combined supporting and spacing means on the handle and projecting outwardly from the upper margin of the basket opposite the handle adapted to position the same selectively within said cooking area or within said draining area.

4. An apparatus of the character described, having in combination a vessel providing a cooking area of approximately half the vertical extent thereof and of narrow width adjacent its lower portion and a draining area of approximately half the vertical extent thereof and of greater width than the lower area adjacent its upper portion, insulating means disposed about the sides and bottom of said lower area of said vessel, a submersible heating element disposed within said lower area in spaced relation to the bottom thereof, and a basket having combined supporting and spacing means on the handle and projecting outwardly from the upper margin of the basket opposite the handle adapted to position the same selectively within said cooking area or within said draining area.

5. An apparatus of the character described, having in combination a vessel providing a cooking area of approximately half the vertical extent thereof and of narrow width adjacent its lower portion and a draining area of approximately half the vertical extent thereof and of greater width than the lower area adjacent its upper portion, insulating means disposed about the sides and bottom of said lower area of said vessel, a submersible heating element in the form of a grid of resistance wire bent upon itself to provide substantially two concentric circular heating areas disposed within said lower area in spaced relation to the bottom thereof, and a basket having supporting means adapted to position the same selectively within said cooking area or within said draining area.

6. An apparatus of the character described, having in combination a vessel providing a cooking area adjacent its lower portion and a draining area adjacent its upper portion, and a basket having supporting means adapted to position the same selectively within said cooking area or within said draining area, said means comprising a handle with an upward extension and a terminal portion substantially in the plane of the upper edge of the basket adapted to be engaged selectively in supporting relation with the upper edge of said vessel at its point of greatest upward extension or in the plane of the handle.

7. An apparatus of the character described, having in combination a vessel providing a cooking area adjacent its lower portion and a draining area adjacent its upper portion, and a basket having supporting means adapted to position the same selectively within said cooking area or within said draining area, said means comprising a handle with an upward extension and a terminal portion substantially in the plane of the upper edge of the basket adapted to be engaged selectively in supporting relation with the upper edge of said vessel at its point of greatest upward extension or in the plane of the handle, and a hook member on the opposite side of said basket adapted selectively to bear against the upper edge of said vessel or contact with the inner wall of said vessel.

8. An apparatus of the character described, having in combination a vessel providing a cooking area adjacent its lower portion and a draining area adjacent its upper portion, and a basket having supporting means adapted to position the same selectively within said cooking area or within said draining area, said means comprising a handle with an upward extension adapted to be engaged selectively in supporting relation with the upper edge of said vessel at its point of greatest upward extension or in the plane of the handle, and a hook member formed of a pair of spaced engaging elements on the opposite side of said basket adapted selectively to bear against the upper edge of said vessel or contact with the inner wall of said vessel.

9. An apparatus of the character described, having in combination an open vessel for French frying providing a cooking area adjacent its lower portion to receive hot oil and a draining area adjacent its upper portion, insulating means disposed about the sides and bottom of said lower area of said vessel, a submersible skeletonized heating element disposed within said lower area in spaced relation to the bottom thereof for heating said oil and causing eddy currents thereof above said element, and a supporting and spacing means interposed between said heating element and the bottom of said vessel to provide an area out of the path of said eddy currents of said oil bath for receiving charred fragments of the material being French fried.

10. An apparatus of the character described, having in combination a vessel providing a cooking area adjacent its lower portion and a draining area adjacent its upper portion, a submersible heating element disposed within said lower area in spaced relation to the bottom thereof, a supporting and spacing means interposed between said heating element and the bottom of said vessel, and a basket having supporting means adapted to position the same selectively within said cooking area or within said draining area.

11. An apparatus of the character described, having in combination a vessel providing a cooking area adjacent its lower portion and a draining area adjacent its upper portion, a submersible heating element disposed within said lower area in spaced relation to the bottom thereof, a supporting and spacing means interposed between said heating element and the bottom of said vessel, and a basket adapted to rest upon said heating element when in its cooking position and means on said basket to support the same on the upper edge of said vessel when in draining position.

12. A cooking vessel having an upper portion of larger diameter and a lower portion of smaller diameter, said portions merging in an inclined area approximately centrally thereof, heating means within said vessel in spaced relation to the bottom thereof, an open basket adapted to receive material to be cooked, a handle element on said basket having an upward extension adapted to bear upon the upper edge of said vessel when the basket is in lowered position, and a hook opposite said handle element adapted to bear against the inclined portion of said vessel when the basket is in cooking position and to engage upon the upper edge of said vessel when the basket is in draining position with the straight portion of such handle bearing on the opposite edge of said vessel.

13. An apparatus of the character described, having in combination a substantially cylindrical cooking vessel, insulating means about the bottom and lower side walls thereof, an electrical heating element adapted to be immersed in the contents of said vessel in spaced relation to the base thereof, an insulated conduit communicating with said heating element adapted to extend about the upper margin of said vessel from the interior thereof to a point adjacent the lower area of said vessel exteriorly thereof, and means for connecting said conduit to a source of electric current at such point.

14. An apparatus of the character described, having in combination a substantially cylindrical cooking vessel, insulating means about the bottom and lower side walls thereof, an electrical heating element adapted to be immersed in the contents of said vessel in spaced relation to the base thereof, an insulated conduit communicating with said heating element adapted to extend about the upper margin of said vessel from the interior thereof to a point adjacent the lower area of said vessel exteriorly thereof, a thermostatic current control element mounted on said vessel adjacent its lower portion, a detachable terminal for connecting said conduit to said thermostatic current control element, and conducting elements connected with said thermostatic current control element.

15. A cooking vessel having an upper portion of larger diameter and a lower portion of smaller diameter, said portions merging in an inclined area approximately centrally thereof, an insulating casing about said lower portion, heating means within said vessel in spaced relation to the bottom thereof, a thermostatic control element provided on one side of said casing adjacent its lower portion, detachable means connecting said heating element with said thermostatic control element, a switch mounted on said casing adjacent its lower portion opposite said thermostatic control element, and conducting elements within the lower portion of said casing connecting said switch and thermostatic control element.

16. A cooking vessel having an upper portion of larger diameter and a lower portion of smaller diameter, said portions merging in an inclined area approximately centrally thereof, an insulating casing about said lower portion, heating means within said vessel in spaced relation to the bottom thereof, a thermostatic control element provided on one side of said casing adjacent its lower portion, detachable means connecting said heating element with said thermostatic control element, a switch mounted on said casing adjacent its lower portion opposite said thermostatic control element, conducting elements within the lower portion of said casing connecting said switch and thermostatic control element, and a detachable plug socket provided adjacent said switch.

17. An apparatus of the character described, having in combination a substantially cylindrical vessel having an upper portion of greater diameter than its lower portion, an inclined wall area associating said upper and lower portions of said vessel, an outer substantially cylindrical casing of a diameter intermediate said upper and lower portions of said vessel adapted to bear at its upper edge against the outer inclined area with its walls and bottom portion in spaced relation to said vessel, studs secured to the outer bottom wall of said vessel and projecting downwardly therefrom, apertures, alined with said studs, in said casing, and means adapted to be engaged with said studs to secure said casing to the lower portion of said vessel.

18. An apparatus of the character described, having in combination a substantially cylindrical vessel having an upper portion of greater diameter than its lower portion, an inclined wall area associating said upper and lower portions of said vessel, an outer substantially cylindrical casing of a diameter intermediate said upper and lower portions of said vessel adapted to bear at its upper edge against the outer inclined area with its walls and bottom portion in spaced relation to said vessel, studs secured to the outer bottom wall of said vessel and projecting downwardly therefrom, apertures, alined with said studs, in said casing, means adapted to be engaged with said studs to secure said casing to the lower portion of said vessel, and additional means adapted to be secured to said studs to provide a plurality of supporting members on the under side of said apparatus.

FRANK E. JONES.